United States Patent
Aadi et al.

(10) Patent No.: US 9,710,801 B2
(45) Date of Patent: Jul. 18, 2017

(54) SYSTEMS AND METHODS FOR CHARGE SPLITTING

(71) Applicant: AMERICAN EXPRESS TRAVEL RELATED SERVICES COMPANY, INC., New York, NY (US)

(72) Inventors: Rajesh K. Aadi, Phoenix, AZ (US); Mansoor A. Jafary, Scottsdale, AZ (US); Robert B. Mawk, Scottsdale, AZ (US); Nagaraj S. Pandit, Peoria, AZ (US); Ganeshbabu G. Subramanian, Glendale, AZ (US)

(73) Assignee: AMERICAN EXPRESS TRAVEL RELATED SERVICES COMPANY, INC., New York, NY (US)

(\*) Notice: Subject to any disclaimer, the term of this patent is extended or adjusted under 35 U.S.C. 154(b) by 59 days.

(21) Appl. No.: 14/258,999

(22) Filed: Apr. 22, 2014

(65) Prior Publication Data

US 2015/0302384 A1 Oct. 22, 2015

(51) Int. Cl.
*G06Q 20/22* (2012.01)
*G06Q 20/14* (2012.01)

(52) U.S. Cl.
CPC .......... *G06Q 20/29* (2013.01); *G06Q 20/14* (2013.01)

(58) Field of Classification Search
USPC ............................................. 705/40
See application file for complete search history.

(56) References Cited

U.S. PATENT DOCUMENTS

| | | | | |
|---|---|---|---|---|
| 7,343,335 | B1* | 3/2008 | Olliphant | G06Q 20/10 705/26.41 |
| 7,970,654 | B2* | 6/2011 | Clibanoff | G06Q 20/102 705/26.1 |
| 8,326,770 | B1 | 12/2012 | Weisman | |
| 8,577,795 | B2 | 11/2013 | Clubb | |
| 8,965,798 | B1 | 2/2015 | Mackrell | |
| 9,576,284 | B2 | 2/2017 | Runyan | |
| 2006/0149671 | A1* | 7/2006 | Nix | G06Q 20/04 705/40 |
| 2009/0299869 | A1 | 12/2009 | Cibanof | |
| 2010/0030578 | A1 | 2/2010 | Siddique et al. | |
| 2010/0121745 | A1 | 5/2010 | Teckchandani | |
| 2011/0225065 | A1 | 9/2011 | Clibanoff | |
| 2012/0173396 | A1 | 7/2012 | Melby | |
| 2012/0185355 | A1 | 7/2012 | Kilroy | |
| 2013/0041824 | A1* | 2/2013 | Gupta | G06Q 40/00 705/44 |

(Continued)

OTHER PUBLICATIONS

"Campaign to Watch: PUMA, Donations & 30% Discounts—Soles4Souls." Soles4Souls. N.p., Aug. 14, 2012. Web. Oct. 6, 2016.*

(Continued)

*Primary Examiner* — Kito R Robinson
*Assistant Examiner* — Shacole Tibljas
(74) *Attorney, Agent, or Firm* — Snell & Wilmer L.L.P.

(57) ABSTRACT

A system, method, and article of manufacture for splitting a shared financial obligation is disclosed. The method may comprise receiving, by a bill splitting computer-based system, a single record of charge (ROC) associated with a purchase by one or more members of a group, and splitting, by the bill splitting computer-based system, the ROC between the members of the group.

19 Claims, 2 Drawing Sheets

(56) References Cited

U.S. PATENT DOCUMENTS

| | | | | |
|---|---|---|---|---|
| 2013/0173470 | A1* | 7/2013 | Nuzzi | G06Q 20/405 705/44 |
| 2014/0032297 | A1* | 1/2014 | Germann | G06Q 30/0226 705/14.26 |
| 2014/0067667 | A1* | 3/2014 | Blanco | G06Q 20/105 705/41 |
| 2014/0108235 | A1* | 4/2014 | Chelst | G06Q 20/22 705/39 |
| 2014/0156517 | A1 | 6/2014 | Argue | |
| 2014/0351130 | A1* | 11/2014 | Cheek | G06Q 20/29 705/44 |
| 2014/0365378 | A1* | 12/2014 | Hummer | G06F 19/328 705/80 |
| 2015/0178725 | A1* | 6/2015 | Poetsch | G06Q 20/40 705/44 |
| 2015/0206122 | A1* | 7/2015 | Elliott | G06Q 20/202 705/21 |

OTHER PUBLICATIONS

"Member Guide." Hilton.com. N.p., Aug. 27, 2003. Web. Oct. 6, 2016. <http://www.hilton.com/en/hhonors/media/pdf/Hilton_HHonors_Member_Rewards_International.pdf>.*
Final Office Action dated Apr. 2, 2015 in U.S. Appl. No. 13/652,906.
Office Action dated Apr. 24, 2014 in U.S. Appl. No. 13/652,906.
Office Action dated Sep. 29, 2014 in U.S. Appl. No. 13/652,906.
Advisory Action dated Jun. 10, 2015 in U.S. Appl. No. 13/652,906.
Final Office Action dated Sep. 20, 2013 in U.S. Appl. No. 13/652,906.
Office Action dated Apr. 25, 2013 U.S. Appl. No. 13/652,906.
Office Action dated Dec. 17, 2015 in U.S. Appl. No. 13/652,906.
Final Office Action dated Jun. 14, 2016 in U.S. Appl. No. 13/652,906.
Office Action dated May 4, 2017 in U.S. Appl. No. 13/652,906.
Wauters, "Microsoft Releases Tag, Its Second Iphone Application," Tech Crunch, Jan. 8, 2009, pp. 1-9.

* cited by examiner

SYSTEMS AND METHODS FOR CHARGE SPLITTING

FIELD

The present disclosure generally relates to payment settlement, and more specifically, to methods and systems for settling payments associated with a group.

BACKGROUND

A group of people may wish to distribute payment of a debt between each member of the group. For example, where a group of friends plans a visit to a movie theater, a first member of the group may pay a taxi fare, while a second member may pay for movie tickets. Similarly, a third member may pay for a meal consumed as part of the activity. Although each member may contribute monetarily to such a group activity, quite often, the amounts contributed by each member are not equal. Similarly, a group of individuals may share a financial obligation, although a single individual may make a single payment towards the obligation, leading to an obligation by members of the group to contribute towards the shared obligation. Thus, systems and methods for settling payment between a plurality of group members are desirable.

SUMMARY

A system and method for splitting a shared financial obligation is disclosed. The method may comprise receiving (by a bill splitting computer-based system) a single record of charge (ROC) associated with a purchase by members of a group, and splitting the ROC between the members of the group.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
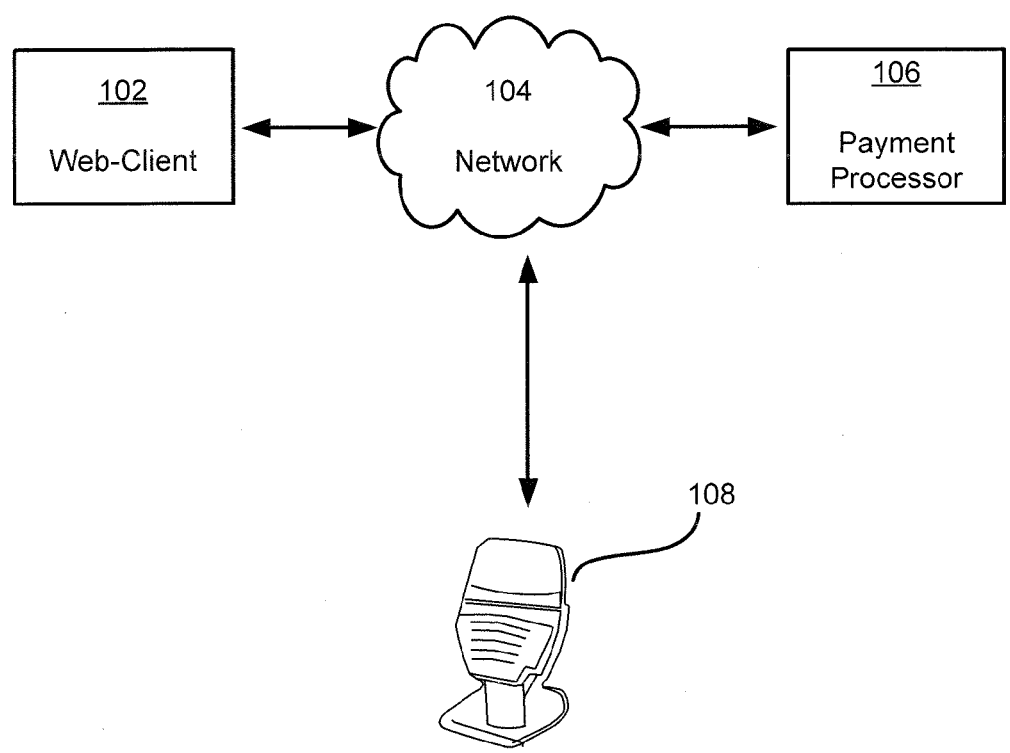
FIG. 1 illustrates, in accordance with various embodiments, a system for settling a group payment.

The present disclosure generally relates to payment settlement, and more particularly to payment settlement between a plurality of group members. The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, account holder, account affiliate, cardmember, member, group member, or the like may be used interchangeably and shall include any person, group, entity, business, organization, business, software, hardware, machine and/or combination of these, and may, in various embodiments, be associated with a transaction account, buy merchant offerings offered by one or more merchants using the account and/or be legally designated for performing transactions on the account, regardless of whether a physical card is associated with the account. For example, a consumer or account affiliate may include a transaction account owner, a transaction account user, an account affiliate, a child account user, a subsidiary account user, a beneficiary of an account, a custodian of an account, and/or any other person or entity affiliated or associated with a transaction account.

A bank may be part of the systems described herein, and the bank may, in various embodiments, represent other types of card issuing institutions, such as credit card companies, card sponsoring companies, or third party issuers under contract with financial institutions. It is further noted that other participants may be involved in some phases of a transaction, such as an intermediary settlement institution.

As used herein, terms such as "transmit," "communicate" and/or "deliver" may include sending electronic data from one system component to another over a network connection. Additionally, as used herein, "data" may include information such as commands, queries, files, data for storage, and the like in digital or any other form.

As used herein, terms such as "transaction" may include one or more approved authorizations. Moreover, as used herein, the phrase "transaction data" may comprise data associated with one or more transactions. In various embodiments, an authorization may be approved by a payment processor in response to a transaction request, which may be initiated by a consumer and/or a merchant.

Phrases and terms similar to "account," "transaction account," "account," "account number," "account code," and/or "consumer account" may include any account that may be used to facilitate a financial transaction. These accounts may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, mobile account, mobile wallet, telephone card, embossed card, smart card, magnetic stripe card, bar code card, transponder, radio frequency card or an associated account.

A record of charge (or "ROC") may comprise a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

In various embodiments, a variety of charge splitting methodologies may be implemented together with and/or apart from the methods and systems described herein. For example, methodologies and systems may be implemented such as those described in U.S. application Ser. No. 13/652, 906, filed Oct. 16, 2012 and entitled SYSTEMS AND METHODS FOR PAYMENT SETTLEMENT, which is hereby incorporated in its entirety by reference.

With reference to FIG. 1, a system 100 configured to settle or split a payment between one or more individuals or members of a group is shown. As discussed herein, each member of a group may comprise an individual and/or a plurality of individuals, each associated with a unique transaction account. Each member of a group may be further associated with a shared financial obligation, as for example, an obligation incurred as a result of a shared transaction. A system 100 may include a web-client 102, a network 104, a payment processor 106, and/or a point of sale terminal ("POS") 108.

The payment processor 106 may be deployed in various configurations, including for example, as a backend processing module, a middleware module, or a hosted application. The payment processor 106 may be deployed by, for example, a card issuer, a banking service provider, a third party service provider or the like. In some embodiments, the payment processor 106 may be hosted on one or more servers of the card issuer or banking service provider. One or more web-clients, such as web-client 102, may communicate with the payment processor 106 via communication network 104. In various embodiments, the payment processor 106 may be hosted as an application service on a remote server of a software-as-a-service provider and/or deployed on a web-client 102 as application software.

A payment processor 106 may be configured to create a group of one or more transaction accounts having a shared financial obligation. Further, in various embodiments, a group of individuals associated with a common transaction account may be created. For instance, a group comprising a married couple who share a common transaction account, but who each use an individual transaction instrument, may be created. In addition, in various embodiments, the transaction accounts may be associated with one or more members of the group that own the transaction accounts. Further, a group may be created in response to a transaction and/or a shared financial obligation. For example, a group may be created and associated with roommates sharing an accommodation, friends, family members, colleagues, acquaintances going for a holiday together, and so forth. Further, in various embodiments, a group may be associated with a label. For example, a group may be labeled "work buddies," "family," and the like.

In addition, the payment processor 106 may create a group. The group may be created, for example, in response to authentication of the transaction accounts having a shared financial obligation and/or a member of the group selecting, from a list or the like, members associated with a shared financial obligation. The payment processor 106 may match identification and/or authentication data provided by the members with the identification and/or authentication data associated with each transaction account. The authentication data may include for example, a username, a password, a unique identifier, a transaction account number, a date of birth, a card expiry date, a card issue date, biometric information, swiping a card associated with the transaction account using suitable hardware (for example, a universal serial bus (USB) card reader), using NFC or scanning the card on an optical character recognition (OCR) enabled device or simply connecting to the payment processor 106 using a registered mobile device, or any combination thereof. The authentication data associated with each member may be stored in a local database or a remote database, as described herein. Thus, the payment processor 106 may facilitate payment settlement between one or more members.

The payment processor 106 may further create a group in response to a group initiation event performed by a group initiator. A group initiator may be any member of a group, including a member who places a group transaction (e.g., a meal for a group and/or the like) on the initiator's transaction instrument. A group initiation event may be, for example, a request for group creation, including information desired for group creation. A request may include at least one of a list of members to whom an invitation is to be sent, an address (e.g., an email address) associated with one or more listed group members, a telephone number associated with a web-client of one or more group members, etc. For example, with continuing reference to FIG. 1, a group initiator may communicate an invitation to join a group for payment settlement by way of a plurality of web-clients 102 to each member owing towards a financial obligation. Such communication may be accomplished in many ways, such for example, by using a telephone number, transaction account number, email address and/or any other unique identifier associated with a group member.

Accordingly, payment processor 106 may be configured to settle one or more of a plurality of ROCs corresponding to a shared financial obligation between a plurality of transaction accounts in a group. To this end, the payment processor 106 may, in various embodiments, receive a ROC and/or store the ROC as part of a transaction history associated with the group members in a database coupled to or comprising the payment processor 106. The payment processor 106 may also receive an indication that one or more of the plurality of ROCs is subject to the shared financial obligation between the plurality of transaction accounts in the group.

In addition, the payment processor 106 may determine or calculate a settlement amount. In various embodiments, the payment processor 106 may calculate a settlement (or cost splitting) amount based on various factors, such as for example, in response to input from one or more members, based on an algorithm, based upon one or more member profiles, based upon previous payments of one or more members, based upon previous obligations of one or more members, based on the historical actions of members, based on trends of members, based on a certain percentage or proportion, the purpose of the event or transaction (e.g., business or personal) and/or based upon a total financial obligation owed by a group. The settlement calculation may also take into consideration other factors, such as for example, one or more members providing past, present or future donations to charities, the status of certain members (e.g., if a member is a guest of another member, one or more members included children at the event), frequency of participation at an event (e.g., first-timers pay less), etc.

In various embodiments, a settlement amount may include an amount owed to and/or an amount owed by one or more group members toward a shared financial obligation. Certain members may not owe anything or only owe a non-proportional amount. A member input may comprise a proportion or division of the shared financial obligation among the group members. Thus, in various embodiments, payment processor 106 may calculate a settlement amount based on received member inputs, such as a proportion or division of a shared financial obligation owed by each group member, from any of the group members (including a group initiator, if any).

Moreover, in various embodiments, the payment processor 106 may calculate a settlement amount based upon a total shared financial obligation. For example, the payment processor 106 may calculate a settlement amount by dividing an amount of a total financial obligation by a number of members of a group. Accordingly, in various embodiments, each member may owe a settlement amount comprising the member's pro rata share toward to the obligation.

The payment processor 106 may communicate (or notify a member of) a settlement amount to one or more group members via any communication means discussed herein or otherwise known in the art. Further, the payment processor 106 may recalculate a settlement amount in response to any of the factors discussed herein, an indication or member input from one or more group members that a calculated settlement amount is not acceptable. In various embodiments, an indication may comprise a modified proportion owed by one or more group members toward the shared financial obligation. In various embodiments, the payment processor 106 may calculate and/or recalculate a settlement amount until all or a certain portion of members of a group accept their respective settlement amounts (which may be the same or different, as discussed herein, depending upon the method by which the settlement amount is calculated).

The payment processor 106 may transfer the accepted settlement amount among each of the transaction accounts in the group. In one embodiment, the payment processor 106 may transfer the accepted settlement amount among each of the transaction accounts in the group immediately or during any time period. In various embodiments, the payment processor 106 may transfer the accepted settlement amount among each of the transaction accounts in the group at a predefined time. The predefined time may be a default time set in the payment processor 106, or may be defined by a group initiator or any other member of the group. The transfer may be dependent on the transaction data, the time of the transaction, the type of the transaction, the number of transactions, the historical actions of members, trends of members and/or the like.

Phrases similar to a "payment processor" may also include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

A web-client 102 may include any device (e.g., a personal computer, a mobile communications device, tablet, and the like) which communicates via any network, for example such as those discussed herein. Further a web-client 102, may include, a MICROSOFT SURFACE table, SAMSUNG SUR40 with MICROSOFT PIXELSENSE, an ASUS TRANFORMER PAD, an EEE PAD TRANSFORMER PRIME, and the like. Furthermore, web-clients 104-110 may be in a home or business environment with access to a network. In an exemplary embodiment, access to the network or the Internet may be through a web-browser software package.

A web-client 102 may include one or more browsers or browser applications and/or application programs, including browser applications comprising Internet browsing software installed within a computing unit or a system to conduct online transactions and/or communications. For example, in various embodiments, a web-client 102 may include (and run) MICROSOFT INTERNET EXPLORER, MOZILLA FIREFOX, GOOGLE CHROME, APPLE SAFARI, and/or any software package available for browsing the Internet. Further, in various embodiments, a web-client 102 may include an AMEX mobile application.

A computing unit or system may take the form of a computer or set of computers, although other types of computing units or systems may be used, including tablets, laptops, notebooks, hand held computers, personal digital assistants, cellular phones, smart phones, set-top boxes, workstations, computer-servers, main frame computers, mini-computers, PC servers, pervasive computers, network sets of computers, personal computers, such as IPADs, IMACs, and MACBOOKS, kiosks, terminals, point of sale (POS) devices and/or terminals, televisions, GPS receivers, in-dash vehicle displays, and/or any other device capable of receiving data over a network. The computing unit of the web-client 102 may be further equipped with an Internet browser connected to the Internet or an intranet using standard dial-up, cable, DSL or any other Internet protocol known in the art. Transactions originating at a web-client 102 may pass through a firewall in order to prevent unauthorized access from users of other networks. Further, additional firewalls may be deployed between the varying components of system 100 to further enhance security.

In various embodiments, a web-client 102 may or may not be in direct contact with an application server. For example, a web-client 102 may access the services of an application server through another server and/or hardware component, which may have a direct or indirect connection to an Internet server. For example, a web-client 102 may communicate with an application server via a load balancer and/or a web server. In an exemplary embodiment, access is through a network or the Internet through a commercially-available web-browser software package.

A web-client 102 may further include an operating system (e.g., WINDOWS NT/95/98/2000/XP/VISTA/7/8/CE/MOBILE/RT/PHONE, OS2, UNIX, Linux, SOLARIS, MACOS, PALMOS, SYMBIAN, ANDRIOD, IOS, BLACKBERRY OS, WEBOS, BADA, etc.) as well as various conventional support software and drivers typically associated with computers. A web-client 102 may be in a home or business environment with access to a network. A web-client 102 may implement security protocols such as Secure Sockets Layer (SSL) and Transport Layer Security (TLS). A web-client 102 may further implement several application layer protocols including http, https, ftp, and sftp.

The payment processor 106 may communicate with a plurality of web-clients (e.g., web-client 102) over communication network 104. The network 104 may include any electronic communications system or method which incorporates hardware and/or software components (e.g. a "cloud" or "cloud computing" system, as described herein). Communication among parties via network 104 may be accomplished through any suitable communication channels, such as, for example, a telephone network, an extranet, an intranet, Internet, point of interaction device (e.g., point of sale device, web-client, personal digital assistant, IPHONE, PALM PILOT, BLACKBERRY cellular phone, kiosk, tablet, table, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system 100 is frequently described herein as being implemented with TCP/IP communications protocols, the system may also be implemented using IPX, APPLETALK, IP-6, NetBIOS, OSI, any tunneling protocol (e.g. IPsec, SSH), or any number of existing or future protocols. If network 104 is in the nature of a public network, such as the Internet, it may be advantageous to presume network 104 to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently and separately or collectively suitably coupled to network 104 via data links which include, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that network 104 may be implemented variously, such as, for example, as an interactive television (ITV) network. Moreover, this disclosure contemplates the use, sale or distribution of any goods, services or information over any network having similar functionality described herein.

As used herein, a "cloud" or "cloud computing" may describe a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

Examples of communication network 104 may include a wide area network (WAN), a local area network (LAN), an Ethernet, Internet, an Intranet, a cellular network, a satellite network, Public Switched Telephony Network (PSTN), and/or any other suitable network for transmitting information as described herein. Communication network 104 may be implemented as a wired network, or a wireless network, and/or a combination thereof.

Any database coupled to the payment processor 106 may include any hardware and/or software suitably configured to facilitate storing information as described herein. One skilled in the art will appreciate that any databases discussed herein may be any type of database, such as relational, hierarchical, graphical, object-oriented, and/or other database configurations. Common database products that may be used to implement the databases include DB2 by IBM, various database products available from ORACLE Corporation, MICROSOFT ACCESS or MICROSOFT SQL SERVER, and/or any other suitable database product.

In various embodiments, a database (not shown) may comprise a temporary and/or permanent database. The data comprising a temporary database may be deleted or otherwise eliminated on a periodic basis and/or in response to an event. For instance, a database may comprise a ROCs database and/or a shared financial transaction database. A ROCs database may store one or more ROCs and/or other transaction data. For example, as discussed below, a ROCs database may store such information in response to an authentication by an individual or group member, as discussed herein, to a system 100. A shared financial transaction database may, similarly, store one or more ROCs and/or other transaction data. A shared financial transaction database may further store a number of members, a group associated with a member, a member identifier, ROC information associated with a member (e.g., a date of a ROC, a subject of a ROC, an amount of a ROC), an amount a member owes toward a shared financial obligation and/or is owed toward the same, and the like. In addition, a shared financial transaction database may store information related to those transactions or ROCs which a group member selects for contribution to a shared financial obligation. A database may reside on a backend system (e.g., as part of system 100) and/or as part of a web-client 102. In various embodiments, a database (and/or its contents) may be deleted in response to a completed settlement. Thus, a member's ROC data may be loaded to a database for settlement purposes, but deleted thereafter to preserve the fidelity and security of the member's ROC data.

Figure 2:
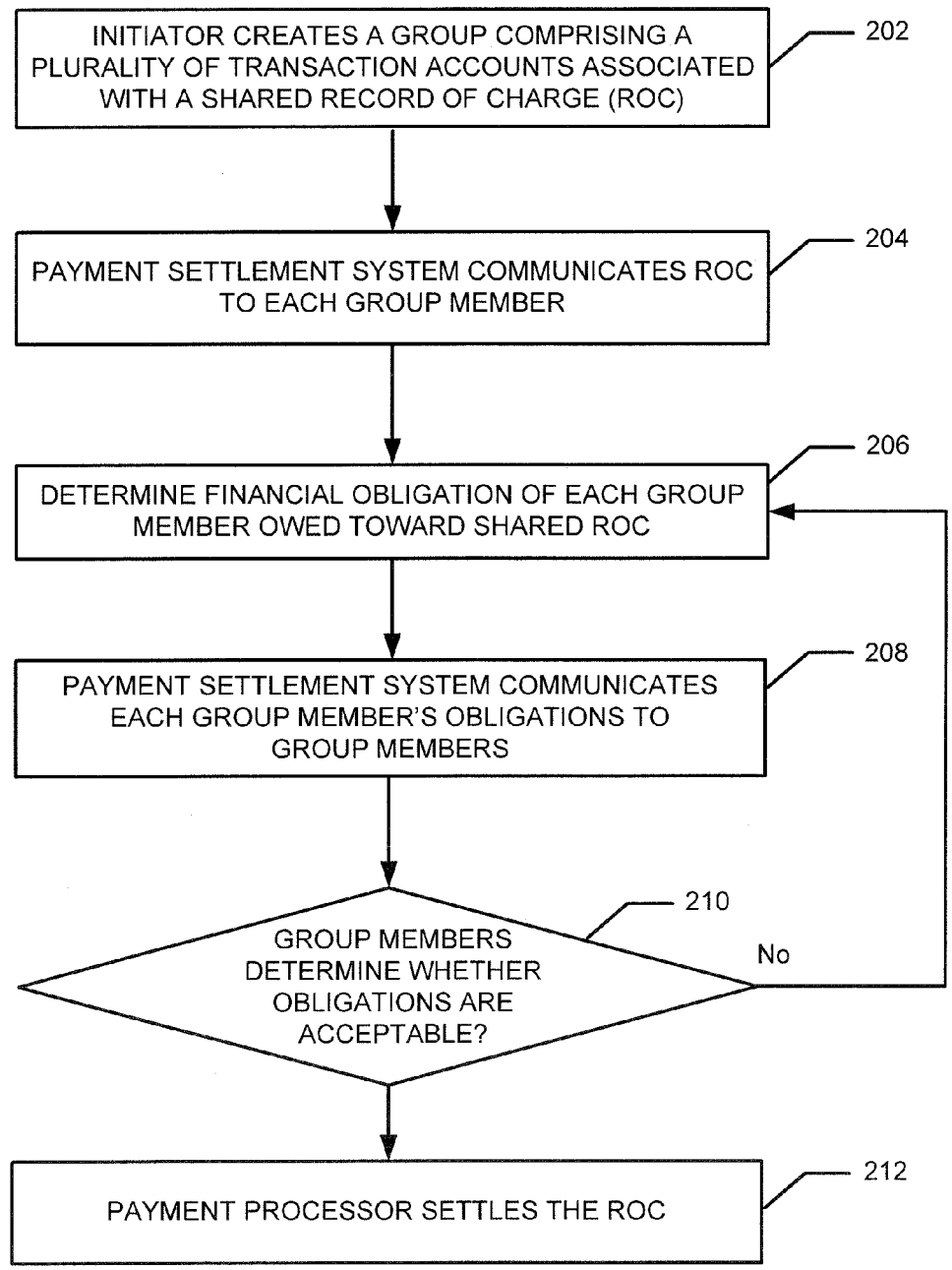
FIG. 2 illustrates, in accordance with various embodiments, a process for settling a group payment.

Referring broadly now to FIG. 2, a process 200 for splitting or sharing a financial transaction is disclosed. However, those of skill in the art will appreciate that the steps recited in any of the method or process descriptions may be executed in any order and are not limited to the order presented. It will be appreciated that the following description makes appropriate references not only to the steps depicted in FIG. 2 but also to the various system components and/or logical representations as described above with reference to FIG. 1.

Accordingly, in various embodiments, a group including a plurality of transaction accounts and/or transaction account owners associated with or owing to a shared financial obligation may be created (e.g., by a group "initiator" (step 202). A group may include one or more members associated with a plurality of transaction accounts. Further, a group may be created in response to receiving a request for group creation. A request for group creation may be received from a group member, such as a member who initiates a group (the group initiator). The initiator may be an individual who incurs a financial obligation on behalf of a group of individuals, each individual owing a proportion of the transaction to the initiator. A request may further include information identifying one or more requested group members (e.g., an email address, a telephone number, and the like). Thus, a request for group creation may be transmitted to one or more prospective or requested group members, each of whom may choose to join the group and/or who must contribute to a financial obligation incurred by an initiator, but owed by one or more of the group (e.g., collectively, in proportion, equally, etc.). As used herein, the financial obligation may be a legal obligation, a moral obligation, an ethical obligation, a friendly obligation, an agreement to the obligation, a non-binding obligation, a binding obligation, a changing obligation, a random obligation and/or the like.

Further, in various embodiments, one or more ROCs (e.g., ROC amounts, ROC dates, etc.) may be transmitted to one or more group members. These ROCs may be associated with one or more transaction accounts of each group member, and a group member may review ROCs to select one or more ROCs which should be included as part of a shared financial obligation. In various embodiments, and as discussed herein, a ROC and/or a notification associated with the ROC may be transmitted to a member in response to a transaction. Where this occurs, a group member may associate the ROC with a shared financial obligation in response to receiving the ROC. Similarly, in various embodiments, one or more ROCs (and/or a percentage of a ROC owed by a group member and/or a notification associated with the ROCs may be communicated (e.g., transmitted) to a group member (e.g., a web-client of the group member) in response to group creation and/or in response to a request by the group member to receive one or more ROCs (step 204) and/or a request by an initiator to transmit one or more ROCs to one or more group members who may collectively owe towards the ROC. A request by a group member to receive one or more ROCs may comprise an action taken by the group member to load an application to a web-client 102. A request may further comprise an interaction by a group member with such an application.

Accordingly, payment settlement system 100 may receive a selection of one or more ROCs for association with a shared financial obligation from one or more group members. Similarly, payment settlement system 100 may receive amounts corresponding to payment methods not associated with ROCs from group members. Further, in various embodiments, a payment settlement system 100 and/or a group initiator and/or a group member may further determine a payment settlement proportion. For example, a group member may receive a payment settlement proportion, which may be generated within payment settlement system 100 based upon one or more ROCs and/or received from one or more group members (step 206). Thus, a payment settlement system 100 may associate one or more ROCs (and/or one or more amounts not associated with a ROC) selected by one or more group members with a shared financial obligation.

A payment settlement system 100 may, in various embodiments, calculate a settlement amount associated with a shared financial obligation for each group member as well (again, step 206). For example, a payment settlement system 100 may calculate a settlement amount for a group member by dividing an amount associated with a shared financial obligation equally and/or based upon a proportion provided by one or more group members on each of the ROCs and other payment modes. The proportion may be automatically allocated and/or provided by one or more group members and/or solely by the group initiator.

A payment settlement system 100 may communicate a settlement amount associated with a group member to one or more group members (step 208). Further, where a settlement amount is not acceptable to one or more group members (e.g., where a member denies the settlement amount), payment settlement system 100 may, for example, re-calculate the settlement amount or prompt the group members who are not accepting the settlement amount to enter a proposed revised amount or a proportion associated with the settlement amount (step 210). Payment settlement system 100 may further recalculate a settlement amount if the settlement amount is not acceptable to each member. Payment settlement system 100 may continue to recalculate a settlement amount (e.g., based on the factors discussed herein) until all or a portion of group members accept the settlement amount.

A payment settlement system 100 may allocate funds corresponding to one or more settlement amounts to one or more appropriate group members (step 212). For instance, a payment settlement system 100 may determine that a group member is associated with a positive settlement amount, in which case system 100 may allocate funds from one or more other group members associated with negative settlement amounts. Thus, a shared financial obligation may be allocated between a plurality of group members in a short amount of time and in an equitable manner. Further, in various embodiments, a settlement amount may be allocated to or from a group member later in time than the time corresponding to the moment when the settlement amount is calculated. A group member (e.g., an initiator) may establish such an allocation time, and/or the time may be a default time associated with the payment settlement system. A settlement amount may also be allocated very soon after the calculation of the settlement amount. A settlement amount may also be transferred in response to a request by one or more group members.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTube, AppleTV, Pandora, xBox, Sony Playstation), a uniform resource locator ("URL"), a document (e.g., a Microsoft Word document, a Microsoft Excel document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel and/or may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and/or a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web-client may be further equipped with an Internet browser connected to the Internet or an intranet using standard dial-up, cable, DSL or any other Internet protocol known in the art. Transactions originating at a web-client may pass through a firewall in order to prevent unauthorized access from users of other networks. Further, additional firewalls may be deployed between the varying components of CMS to further enhance security.

A firewall may include any hardware and/or software suitably configured to protect CMS components and/or enterprise computing resources from users of other networks. Further, a firewall may be configured to limit or restrict access to various systems and components behind the firewall for web-clients connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U. S. C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, any transponder, transponder-reader, and/or transponder-reader system may be configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment gateway" or "gateway" may also include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method comprising:
receiving, by a computer-based system and from a group initiator, a request to establish a group of members in a database, wherein the group initiator and the members share a shared financial obligation, wherein the group initiator incurred the shared financial obligation using an account number for a transaction account of the group initiator;

storing, by the computer-based system, the shared financial obligation in a database as ungrouped data elements via a fixed memory offset using a binary large object method with different data sets from different owners with different formats;

tuning, by the computer-based system, the database to optimize database performance, wherein the tuning includes placing frequently used files on separate file systems to reduce in and out bottlenecks;

annotating, by the computer-based system, the shared financial obligation with a header, trailer or indicator to convey information for managing the shared financial obligation;

annotating, by the computer-based system, the shared financial obligation to include security information establishing access levels;

providing, by the computer-based system, based on the security access level and in response to updating a permissions indicator, access to the shared financial obligation;

designating, by the computer-based system, a type of the shared financial obligation as a key field in a plurality of related data tables to speed searching for the data;

linking, by the computer-based system, the plurality of related data tables based on the type of the shared financial obligation in the key fields;

partitioning, by the computer-based system and using the key field, the database according to a class of objects defined by the key field to speed searching for the shared financial obligation;

sorting, by the computer based system, the shared financial obligation according to a known order to simplify the lookup process;

obtaining, by the computer-based system, the shared financial obligation from the database;

providing, by the computer-based system and based on the creating the members of the group, to the members over the internet and via an app to web clients of the members, a plurality of record of charges (ROCs) associated with the shared financial obligation by the group initiator, wherein the ROCs include location, merchant identifier, transaction amount, transaction date, and the account number;

authenticating, by the computer-based system and in response to the providing, transaction accounts for the members of the group based on the account numbers in the ROCs;

receiving, by the computer-based system and via the app from the web clients of the members and in response to the providing, a selection from one or more members of the group of one or more of the ROCs from the plurality of ROCs associated with the shared financial obligation to create member-selected ROCs, wherein the selection is based on the account numbers in the ROCs;

determining, by the computer-based system and in response to the receiving, a split instruction for the member-selected ROCs based on the account numbers in the ROCs;

splitting, by the computer-based system and based on the split instruction, the member-selected ROCs between the members of the group and the group initiator based on the account numbers in the ROCs;

transmitting, by the computer-based system and via the app to the web clients of the members and in response to the splitting, a notification to the members of the group, wherein the notification includes the member-selected ROCs, the split instruction and a description of the shared financial obligation.

2. The method of claim 1, wherein the split instruction includes splitting, by the bill splitting computer-based system, the member-selected ROCs between the group initiator and the members of the group based upon input from one or more members, an algorithm, one or more member profiles, payments of one or more members prior to the shared financial obligation, obligations of one or more members prior to the shared financial obligation, based on historical actions of members, trends of members, a certain percentage or proportion, a purpose of an event or a transaction that caused the shared financial obligation, a total financial obligation owed by a group, one or more members providing past, present or future donations to charities, status of certain members, a member being a guest of another member, one or more members having children at the event, and frequency of participation at an event.

3. The method of claim 1, wherein the split instruction includes splitting, by the bill splitting computer-based system, the member-selected ROCs proportionally between group initiator and the members of the group.

4. The method of claim 1, wherein the split instruction includes splitting, by the bill splitting computer-based system, according to a percentage owed by the group initiator and the members of the group toward the member-selected ROCs.

5. The method of claim 1, wherein the split instruction includes automatically allocating, by the bill splitting computer-based system, percentages of the member-selected ROCs between the group initiator and the members of the group.

6. The method of claim 1, further comprising splitting, by the bill splitting computer-based system, rewards associated with the member-selected ROCs based on the split instruction.

7. The method of claim 1, further comprising:
receiving, by the bill splitting computer-based system and in response to the receiving the request, a label for the group;
authenticating, by the bill splitting computer-based system and in response to the receiving the request, transaction accounts for the members of the group; and
creating, by the bill splitting computer-based system and in response to the authenticating, the group with the label and the members having authenticated transaction accounts.

8. The method of claim 6, wherein the split instruction is based on at least one of input from one or more members, an algorithm, one or more member profiles, previous payments of the one or more members, previous obligations of the one or more members, the historical actions of the members, trends of the members, a percentage, a proportion, a purpose of the event, a purpose of the transaction, a total financial obligation owed by the group, donations to charities by the one or more members, a status of a member, or frequency of participation at an event.

9. The method of claim 8, wherein the members of the group are selected for the group based on authentication data and identification data.

10. The method of claim 9, further comprising:
re-allocating, by the bill splitting processor, the shared financial obligation to create a revised split instruction, in response to receiving a rejection of the split instruction from any one member of the group;
transmitting, by the bill splitting processor, a subsequent notification to the members of the group, wherein the subsequent notification includes the ROC, the revised split instruction and a description of the shared financial obligation, wherein the re-allocating and the transmitting subsequent notifications continue until receiving an approval of the revised split instruction from all members of the group;

adjusting, by the bill splitting processor, the shared financial obligation of the group initiator based on the revised split instruction, in response to the receiving of the approval of the revised split instruction from all members of the group;

applying, by the bill splitting processor, the shared financial obligation to the members of the group based on the revised split instruction; and settling, by the bill splitting processor, the ROC corresponding to the revised split instruction between transaction accounts of each of the members of the group.

11. The method of claim 10, wherein the creating the members of the group occurs prior to incurring the shared financial obligation.

12. The method of claim 11, further comprising authorizing, by the bill splitting processor, each transaction account of each member of the group for the split amount contained in the split instruction.

13. The method of claim 12, further comprising settling, by the bill splitting processor, a dispute as to the shared financial obligation.

14. The method of claim 13, further comprising:

wherein the expense related to the ROC is reimbursed by the member using member funds, wherein an authorization for a full amount of the shared financial obligation is based on the transaction account of the group initiator, and wherein the full amount of the shared financial obligation is charged to the transaction account of the group initiator, wherein a portion of the full amount of the shared financial obligation is received by the group initiator from transaction accounts of the members of the group; and wherein each of the transaction accounts of the members are charged a portion of the full amount of the member-selected ROCs based on the split instructions and the transaction account of the group initiator is credited the portion of the amount of the member-selected ROCs.

15. An article of manufacture including a non-transitory, tangible computer readable storage medium having instructions stored thereon that, in response to execution by a computer-based system, cause the computer-based system perform operations comprising:

receiving, by the computer-based system and from a group initiator, a request to establish a group of members in a database, wherein the group initiator and the members share a shared financial obligation, wherein the group initiator incurred the shared financial obligation using an account number for a transaction account of the group initiator;

storing, by the computer-based system, the shared financial obligation in a database as ungrouped data elements via a fixed memory offset using a binary large object method with different data sets from different owners with different formats;

tuning, by the computer-based system, the database to optimize database performance, wherein the tuning includes placing frequently used files on separate file systems to reduce in and out bottlenecks;

annotating, by the computer-based system, the shared financial obligation with a header, trailer or indicator to convey information for managing the shared financial obligation;

annotating, by the computer-based system, the shared financial obligation to include security information establishing access levels;

providing, by the computer-based system, based on the security access level and in response to updating a permissions indicator, access to the shared financial obligation;

designating, by the computer-based system, a type of the shared financial obligation as a key field in a plurality of related data tables to speed searching for the data;

linking, by the computer-based system, the plurality of related data tables based on the type of the shared financial obligation in the key fields;

partitioning, by the computer-based system and using the key field, the database according to a class of objects defined by the key field to speed searching for the shared financial obligation;

sorting, by the computer based system, the shared financial obligation according to a known order to simplify the lookup process;

obtaining, by the computer-based system, the shared financial obligation from the database;

providing, by the computer-based system and based on the creating the members of the group, to the members over the internet and via an app to web clients of the members, a plurality of record of charges (ROCs) associated with the shared financial obligation by the group initiator, wherein the ROCs include location, merchant identifier, transaction amount, transaction date, and the account number;

authenticating, by the computer-based system and in response to the providing, transaction accounts for the members of the group based on the account numbers in the ROCs;

receiving, by the computer-based system and via the app from the web clients of the members and in response to the providing, a selection from one or more members of the group of one or more of the ROCs from the plurality of ROCs associated with the shared financial obligation to create member-selected ROCs, wherein the selection is based on the account numbers in the ROCs;

determining, by the computer-based system and in response to the receiving, a split instruction for the member-selected ROCs based on the account numbers in the ROCs;

splitting, by the computer-based system and based on the split instruction, the member-selected ROCs between the members of the group and the group initiator based on the account numbers in the ROCs;

transmitting, by the computer-based system and via the app to the web clients of the members and in response to the splitting, a notification to the members of the group, wherein the notification includes the member-selected ROCs, the split instruction and a description of the shared financial obligation.

16. The article of claim 15, wherein the split instruction includes splitting, by the bill splitting computer-based system, the member-selected ROCs between the group initiator and the members of the group based upon input from one or more members, an algorithm, one or more member profiles, payments of one or more members prior to the shared financial obligation, obligations of one or more members prior to the shared financial obligation, based on historical actions of members, trends of members, a certain percentage or proportion, a purpose of an event or a transaction that caused the shared financial obligation, a total financial obligation owed by a group, one or more members providing past, present or future donations to charities, status of certain members, a member being a guest of another member, one or more members having children at the event, and frequency of participation at an event.

17. The article of claim 15, wherein the split instruction includes splitting, by the bill splitting computer-based system, the member-selected ROCs proportionally between the group initiator and the members of the group.

18. The article of claim 15, wherein the split instruction includes splitting, by the bill splitting computer-based system, according to a percentage owed by the group initiator and the members of the group toward the member-selected ROCs.

19. A system comprising:
a processor;
a tangible, non-transitory memory configured to communicate with the bill splitting processor; and
the tangible, non-transitory memory having instructions stored thereon that, in response to execution by the bill splitting processor, cause the bill splitting processor to be capable of performing operations comprising:
receiving, by the processor and from a group initiator, a request to establish a group of members in a database, wherein the group initiator and the members share a shared financial obligation, wherein the group initiator incurred the shared financial obligation using an account number for a transaction account of the group initiator;
storing, by the processor, the shared financial obligation in a database as ungrouped data elements via a fixed memory offset using a binary large object method with different data sets from different owners with different formats;
tuning, by the processor, the database to optimize database performance, wherein the tuning includes placing frequently used files on separate file systems to reduce in and out bottlenecks;
annotating, by the processor, the shared financial obligation with a header, trailer or indicator to convey information for managing the shared financial obligation;
annotating, by the processor, the shared financial obligation to include security information establishing access levels;
providing, by the processor, based on the security access level and in response to updating a permissions indicator, access to the shared financial obligation;
designating, by the processor, a type of the shared financial obligation as a key field in a plurality of related data tables to speed searching for the data;
linking, by the processor, the plurality of related data tables based on the type of the shared financial obligation in the key fields;
partitioning, by the processor and using the key field, the database according to a class of objects defined by the key field to speed searching for the shared financial obligation;
sorting, by the computer based system, the shared financial obligation according to a known order to simplify the lookup process;
obtaining, by the processor, the shared financial obligation from the database;
providing, by the processor and based on the creating the members of the group, to the members over the internet and via an app to web clients of the members, a plurality of record of charges (ROCs) associated with the shared financial obligation by the group initiator, wherein the ROCs include location, merchant identifier, transaction amount, transaction date, and the account number;
authenticating, by the processor and in response to the providing, transaction accounts for the members of the group based on the account numbers in the ROCs;
receiving, by the processor and via the app from the web clients of the members and in response to the providing, a selection from one or more members of the group of one or more of the ROCs from the plurality of ROCs associated with the shared financial obligation to create member-selected ROCs, wherein the selection is based on the account numbers in the ROCs;
determining, by the processor and in response to the receiving, a split instruction for the member-selected ROCs based on the account numbers in the ROCs;
splitting, by the processor and based on the split instruction, the member-selected ROCs between the members of the group and the group initiator based on the account numbers in the ROCs;
transmitting, by the processor and via the app to the web clients of the members and in response to the splitting, a notification to the members of the group, wherein the notification includes the member-selected ROCs, the split instruction and a description of the shared financial obligation.

* * * * *